United States Patent [19]
Zweegers

[11] Patent Number: 4,727,712
[45] Date of Patent: Mar. 1, 1988

[54] MOWING DEVICE

[75] Inventor: Petrus W. Zweegers, Geldrop, Netherlands

[73] Assignee: P.J. Zweegers en Zonen B.V., Geldrop, Netherlands

[21] Appl. No.: 870,917

[22] Filed: Jun. 5, 1986

[30] Foreign Application Priority Data

Jun. 26, 1985 [NL] Netherlands ............... 8501837

[51] Int. Cl.[4] ............................................. A01D 57/30
[52] U.S. Cl. ....................................................... 56/192
[58] Field of Search .................... 56/192, 13.6, 6, 1, 56/DIG. 21, 371

[56] References Cited

U.S. PATENT DOCUMENTS 3,772,865 11/1973 Ruprecht et al. ............... 56/192
4,094,132 6/1978 Decoene et al. ............... 56/192 X

FOREIGN PATENT DOCUMENTS 2147056 5/1972 Fed. Rep. of Germany ........ 56/192
3029556 4/1982 Fed. Rep. of Germany .
2553965 5/1985 France .
6714322 4/1969 Netherlands .

Primary Examiner—James A. Leppink
Assistant Examiner—Hoang C. Dang
Attorney, Agent, or Firm—Edmund M. Jaskiewicz

[57] ABSTRACT

Mowing device provided with a frame (1) and at least two cuttig elements (2-5) comprising collars (7) supporting cutters and rotatable about upwardly extending axes of rotation, which cutting elements (2-5) can be rotated in opposite directions such that during operation the facing sides of the cutting elements move in a direction opposite to the intended direction of displacement (A) of the mowing device, whilst near the rearmost part of an outermost cutting element, (2,5) there has been provided a freely rotatable swath wheel (13) for guiding the cut crop onto a window, said swath wheel (13) being arranged so that seen from above said swath wheel (13, 15) overlap at least partly said collar, whereby near the rearmost side of said outermost cutting element (2, 5) there have been provided two swath wheels (13, 15) overlapping each other when seen in the intended direction of movement of the device whereby the arrangement is so that axis of rotation (14) of the foremost swath wheel (13) includes a smaller angle with the horizontal than does the axis of rotation (17) of the hindmost swath wheel (15) located behind said foremost swath wheel.

9 Claims, 3 Drawing Figures

MOWING DEVICE

The invention relates to a mowing device provided with a frame and at least two cutting elements comprising collars supporting cutters and rotatable about upwardly extending axes of rotation, which cutting elements can be rotated in opposite directions such that during operation the facing sides of the cutting elements move in a direction opposite to the intended direction of movement of the mowing device, whilst near the rearmost parts of an outermost cutting element there has been provided a freely rotatable swath wheel for guiding the cut crop onto a windrow, said swath wheel being arranged so that seen from above said swath wheel overlap at least partly said collar.

With usual mowing devices of the above kind one single, freely rotatable swath wheel is arranged near the rear side of a cutting element for displacing the cut crop transverse to the direction of displacement of the device in order to windrow the crop. Practice has taught, however, that these known solutions often do not produce satisfactory results, i.e. that often it is impossible with such constructions to form a relatively small windrow, which e.g. is suitable for being picked up by a self-loading wagon, a baler or the like.

From FR-A-2.553.965 there is known a mowing device wherein the swath wheel is arranged in such a manner that the axis of rotation of said swath wheel extends substantially horizontally. In such an arrangement at least part of the crop tends to pass under the swath wheel. Further there is known from NL-A-6.714.322 a mowing device wherein the swath wheel has been arranged in such a manner that the axis of rotation of the swath wheel extends in a vertical or substantially vertical direction. With such an arrangement there is a risk of at least part of the crop passing over the swath wheel. It will be apparent that in both cases the width of the windrow may be considerably greater than intended, so that such a wide windrow usually cannot be picked up by means of a selfloading wagon, baler or the like.

The purpose of the invention now is to obtain a mowing device of the above kind, whereby the disadvantages inherent in said known mowing devices can be met.

According to the invention this can be achieved in that near the rearmost side of said outermost cutting element there have been provided two swath wheels overlapping each other when seen in the intended direction of movement of the device, whereby the arrangement is so that the axis of rotation of the foremost swath wheel includes a smaller angle with the horizontal than does the axis of rotation of the hindmost swath wheel located behind said foremost swath wheel.

In using the construction according to the invention at least a large part of the cut crop will be displaced sideways in the manner and to the extent aimed at by means of the front wheel, whilst crop which possibly passes under said front wheel will be caught by the wheel located therebehind and also be displaced sideways, so that in a simple manner a windrow of the desired comparatively small width can be formed and pathways for the tractor wheels from which the crop has been removed are obtained.

In view of the fact that both swath wheels are arranged close to the cutting element co-operating with said swath wheels there is assured a smooth taking over of the crop thrown to the rear by said cutting elements. Further there is obtained a compact structure of the mowing device which is especially important in mowing devices mounted on the front of a tractor during use. It is noted that from DE-A-3.029.556 there is known a mowing device having a cutter bar extending transverse to the intended direction of travel. Near one end of said cutter bar there have been arranged two swath wheels overlapping each other and being rotatable about parallel axes of rotation. Between said swath wheels and the end of the cutter bar there has been provided a guide rod for the crop. During working such a cutter bar is moved forward rather slowly when compared with the speed of movement of a mowing device having rotating cutting elements. Thereby the crop cut by said cutter bar remains more or less in a standing position and is gently engaged and guided by said guide rod and swath wheels which are located at a relatively great distance behind said cutter bar. However such an arrangement is not usable in a mowing device wherein the cut crop is thrown to the rear by the fast rotating cutting elements.

The invention will be more fully explained hereinafter with reference to the accompanying figures, in which an embodiment of a mowing device according to the invention is diagrammatically illustrated.

Figure 1:
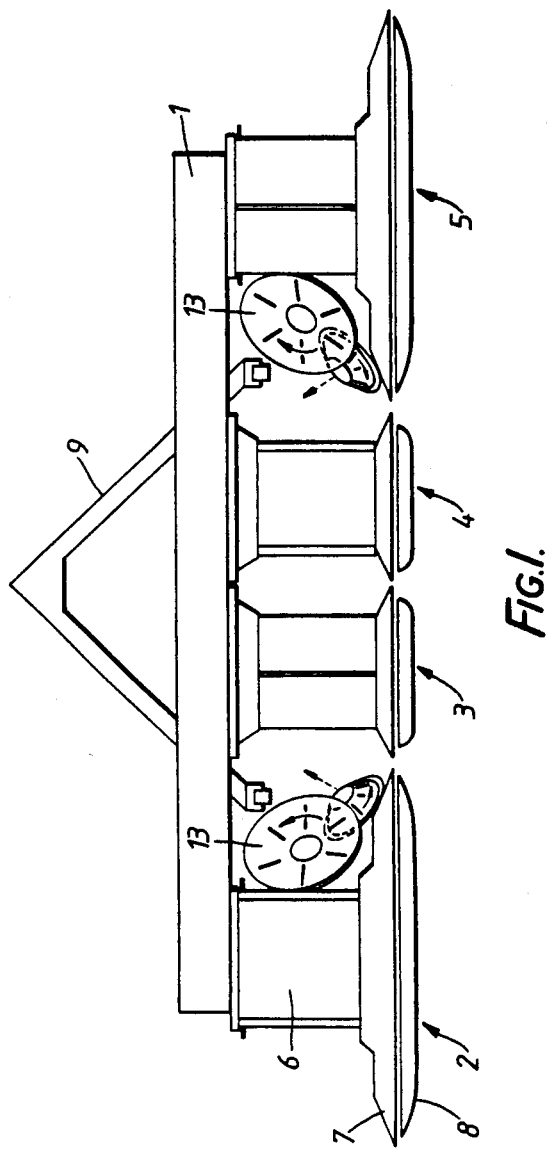
FIG. 1 is a front view of an embodiment of a mowing device according to the invention.
Figure 2:
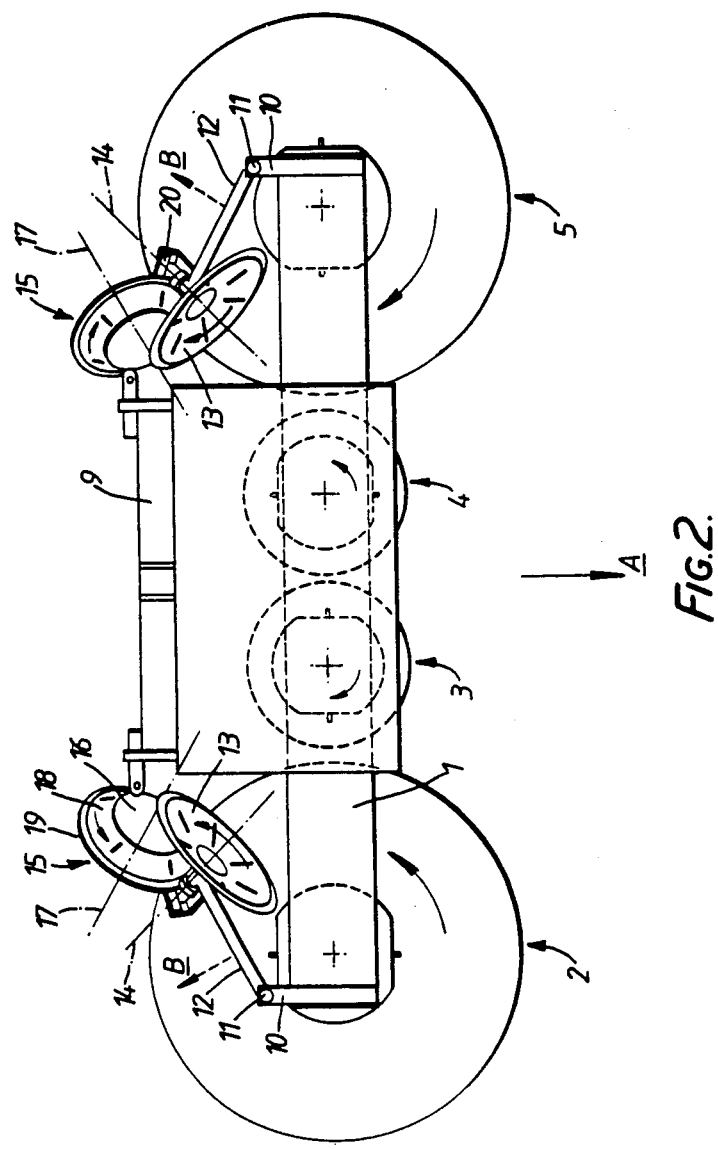
FIG. 2 is a top view of FIG. 1.
Figure 3:
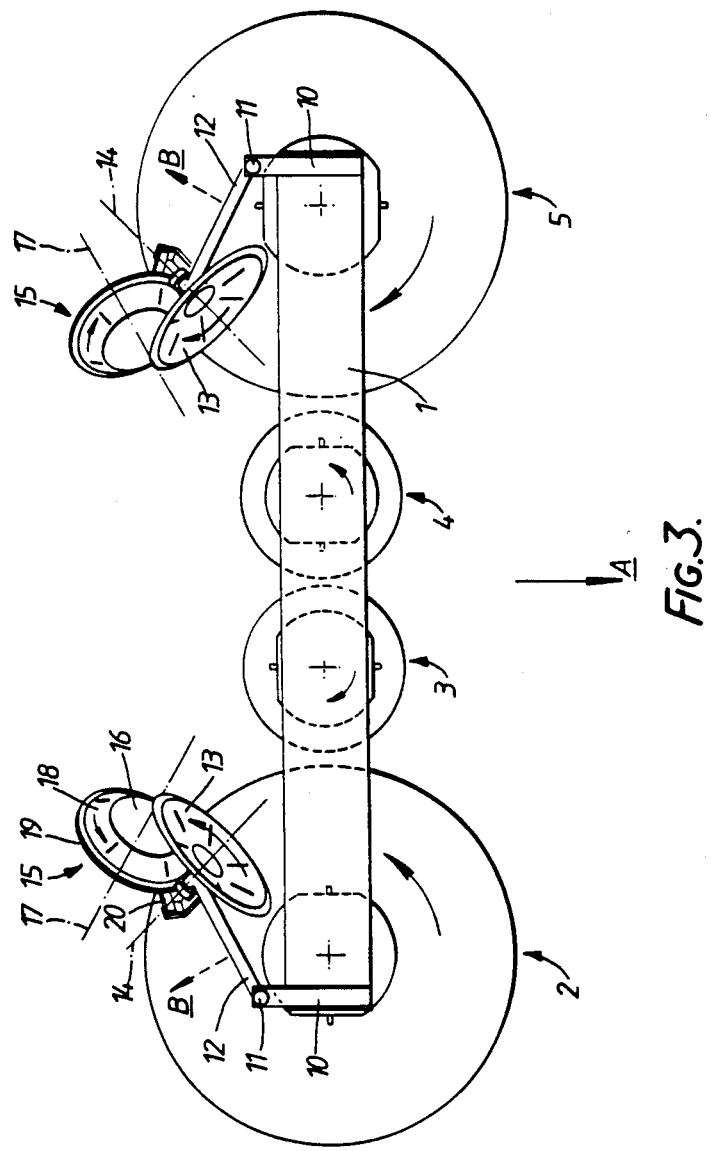
FIG. 3 is a view corresponding with FIG. 2, whereby a few parts have been left out.

The mowing machine illustrated in FIGS. 1 and 2 comprises an elongated frame beam 1 to which four cutting elements 2-5, arranged under said frame beam, have been mounted. Said cutting elements, rotatable about at least substantially vertically extending axes of rotation, have been constructed in the usual manner and each comprise a drum 6 to whose bottom side an annular collar 7 has been fixed. To each of said collars 7 a number of cutters, not illustrated, have been fixed in the usual manner. Under the annular collars 7 dishes 8 have been arranged by means of which the device can be supported on the ground during operation.

In the frame beam 1 there have been provided driving means (not shown), for driving the cutting elements such that a pair of adjacent cutting elements can be rotated in opposite directions in the usual manner during operation, as illustrated with arrows in FIG. 2.

Furthermore a coupling member 9 has been fixed to the frame, by means of which the mowing device can be coupled to the front of a tractor or similar vehicle, in order to be moved during operation into the direction according to arrow A (FIG. 2). It will be apparent, however, that the construction according to the invention can also be used with a mowing device that is drawn.

As further appears from the figures the annular collars 7 of the outer cutting elements 2 and 5 have a larger diameter than the annular collars of the two central cutting elements 3 and 4.

Near the outer cutting elements beams 10 extending perpendicularly to the frame beam have been fixed to said frame beam. Coupled to the rear ends of said beams 10, by means of pivot axes 11 extending parallel to the at least substantially vertical axes of rotation of the cutting elements there have been coupled the ends of arms 12, extending from the pivot axes 11, obliquely to the rear and into a direction towards each other.

Stops (not shown), prevent pivoting of the arms 12 into the direction of the front side of the mowing device, whilst the arms 12, against the action of springs (not shown), may pivot into the direction according to the arrows B.

At the end of each arm 12 there has been provided a freely rotatable swath wheel 13, constructed somewhat conical, whereby the top of the cone, seen in the direction of displacement, is located behind the outer boundary edge of the cone in question.

The axis of rotation 14 of each swath wheel 13 is located in an at least substantially vertical plane, including an angle of about 45° with a vertical plane parallel to the intended direction of movement according to arrow A. The axis of rotation 14 thereby also includes an angle of about 20° with the horizontal.

An additional swath wheel 15 has been arranged behind each swath wheel 13. Said swath wheel 15 comprises a central disc-shaped part 16, extending perpendicularly to the axis of rotation 17 of said swath wheel, whilst joining the outer circumference of said disc-shaped part is a conical edge 18 with a diameter increasing into a direction remote from the disc 16 and, at its side remote from the disc 16, changing into an edge 19 extending outwards and parallel to the disc 16.

The wheel 15 has been provided freely rotatable on a support 20, which in its turn has been coupled to the arm 12 such that the support 20 is freely rotatable about the axis of rotation 14 of the wheel 13. A stop (not shown) has been provided for limiting pivoting of the wheel 15 and the support 20 into a downward direction.

The axis of rotation 17 of the wheel 15 is located in a vertical plane including an angle of about 55° with a vertical plane parallel to the direction of movement, whilst the axis of rotation 17 includes an angle of about 50° with the horizontal.

As further appears from FIG. 2, the centre of the disc 13, seen in top view, lies above the annular collar 7 of the outer cutting element 2, 5 respectively, but still within the outer circumference of said collar 7.

Seen in top view the swath wheel 15 lies largely behind the collar 7 of the cutting element 2, 5 respectively.

As appears in particular from FIG. 1 the front swath wheel 13 overlaps the rear swath wheel 15.

During operation the device will be displaced into the direction according to arrow A and the cutting elements will be rotated into directions as indicated by the arrows. The cut crop will thereby be displaced towards the rear between the drums of the cutting elements 2 and 3 and between the drum of the cutting elements 4 and 5.

The crop, moving toward the rear across the annular collar 7 of the outer cutting elements will be caught by the foremost swath wheels 13, rotate said freely rotatable swath wheels, as indicated by the arrows, and thus be displaced sideways by said swath wheels 13 with a view to forming a windrow which is substantially smaller than the mowing width of the device. As will be apparent in particular from FIG. 1 crop which possibly passes under the swath wheels 13 will be caught by the swath wheels 15 arranged behind said swath wheels 13 and also be displaced sideways into the direction of the centre of the mowing device by said swath wheels 15 which are rotated by the crop.

When, possibly, too large accumulations of crop occur, the spring-loaded swath wheels can move sideways by pivoting about the axes 11 into the direction according to the arrows B.

Because of their chosen arrangement the swath wheels 13 and 15 form one compact unit, which can simply be fixed to the frame of the mowing device without hampering thereby the coupling of the mowing device to the tractor. Furthermore said swath wheels effect an effective displacement of the cut crop, so that even with a mowing device with a comparatively large mowing width a comparatively small windrow can be produced.

It will be apparent that within the spirit and scope of the invention additions and/or alterations to the construction described hereinabove will be conceivable.

So the angle values provided hereinabove are values that have proved to be advantageous in practice, but it will be apparent that also deviations from these values are conceivable. Furthermore it is possible, if desired, to incorporate more than two swath wheels in a group, and/or to incorporate a fixed swath board next to the swath wheels.

Furthermore the invention is of course not limited to a device provided with four cutting elements or to a device whereby the outer cutting elements have a large diameter than the inner cutting elements, although the application of the groups of swath boards according to the invention may be particularly advantageous with such a device whereby the outer cutting elements have a comparatively large diameter and therefore also a comparatively large working width and thus cut a comparatively great deal of crop and displace it to the rear.

I claim:

1. A mowing device having a direction of movement (A) during operation and comprising a frame beam (1) substantially transverse to said direction of movement, at least two cutting elements (2–5) carried by said frame beam and rotatable about vertically extending rotary axes, said cutting elements each comprising collars (7) and cutters attached to said collars, the cutting elements being driven so that during operation adjacent portions of adjacent cutting elements move in a direction opposite to said direction of movement, a freely rotatable first swath wheel (13) disposed at the rear most portion of an outter most cutting element with respect to said direction of movement and at least partially above the collar of said cutting element, a freely rotatable second swath wheel (15) disposed rearwardly of and at least partially overlapping said first swath wheel with respect to said direction of movement, the axis of rotation (14) of said first swath wheel being inclined at a smaller angle to the horizontal than the axis of rotation of said second swath wheel (17), a portion of said second swath wheel being lower than said first swath wheel such that any portion of a crop cut by said outter most cutting element which portion passes under said first swath wheel will be caught by said second swath wheel.

2. Mowing device as claimed in claim 1 wherein the axis of rotation (14) of the first swath wheel (13) includes an angle of about 20 deg. with the horizontal plane.

3. Mowing device as claimed in claim 1 wherein the axis of rotation (17) of the second swath wheel (15) includes an angle of about 50 deg. with the horizontal plane.

4. Mowing device as claimed in claim 1 wherein the axis of rotation (14) of the first swath wheel (13) is located in a vertically standing plane, which includes an angle of about 45 deg. with a vertical plane parallel to the direction of movement (A).

5. Mowing device as claimed in claim 1 wherein the axis of rotation (17) of the second swath wheel includes an angle of about 55 deg. with a vertical plane parallel to the direction of movement.

6. Mowing device as claimed in claim 1 wherein the swath wheels (13, 15) have been mounted on an arm (12) which can pivot to the rear. against spring-load, about an axis (11) which is located at a larger distance from the centre of the mowing device than the two swath wheels (13, 15).

7. Mowing device as claimed in claim 1 wherein the second swath wheel (15) has been fixed to a support (20) which is freely rotatable about the axis of rotation (14) of the first swath wheel (13).

8. Mowing device as claimed in claim 1 wherein said collars are annular, seen in top view, the axis of rotation of the first swath wheel (13) is located above and near the circumference of the annular collar (7), and said second swath wheel (15) is located mainly behind the annular collar (7).

9. Mowing device as claimed in claim 1 wherein the swath wheels (13, 15) are positioned in such a manner that during operation the lowest points of the wheels are located at a distance from the ground at least that distance of said collars.

* * * * *